United States Patent [19]
Geiszler et al.

[11] Patent Number: 5,565,846
[45] Date of Patent: Oct. 15, 1996

[54] READER SYSTEM FOR WASTE BIN PICKUP VEHICLES

[75] Inventors: Theodore D. Geiszler, Los Gatos; Noel H. Eberhardt, Cupertino; Russel E. Walker, San Jose; Herbert P. Radding, Saratoga, all of Calif.

[73] Assignee: Indala Corporation, San Jose, Calif.

[21] Appl. No.: 312,199

[22] Filed: Sep. 26, 1994

Related U.S. Application Data

[63] Continuation-in-part of Ser. No. 232,478, Apr. 26, 1994, abandoned.

[51] Int. Cl.⁶ .................................................. G08G 13/14
[52] U.S. Cl. ...................... 340/572; 340/551; 340/825.3; 340/825.34; 177/139; 177/145
[58] Field of Search ..................... 340/572, 551, 340/825.34, 825.3; 177/139, 145

[56] References Cited

U.S. PATENT DOCUMENTS

| | | | |
|---|---|---|---|
| 5,012,236 | 4/1991 | Troyk et al. | 340/572 |
| 5,099,226 | 4/1992 | Andrews | 340/572 |
| 5,099,227 | 3/1992 | Geiszler et al. | 340/572 |
| 5,221,831 | 8/1993 | Geiszler | 340/572 |
| 5,230,393 | 7/1993 | Mezey | 177/139 |

Primary Examiner—Jeffery A. Hofsass
Assistant Examiner—Benjamin C. Lee
Attorney, Agent, or Firm—Spencer & Frank

[57] ABSTRACT

A reader for radio frequency identification tags having at least one magnetic field transmitting and receiving coil which is oriented in a given plane and which is responsive to a received magnetic exciter field of a first frequency to produce and radiate an identifying magnetic field comprised of a carrier at a second different frequency modulated by an identifying code. The reader comprises a first circuit for producing a radio frequency signal of the first frequency; a first magnetic field coupling arrangement connected to the output of said first circuit for producing a corresponding exciter field at the first frequency to be magnetically coupled to the receiving coil of the tag, with the first magnetic field coupling arrangement including a solenoidal exciter coil having at least one wound exciter winding and a longitudinal axis disposed substantially perpendicular to the plane of the tag coil; a second magnetic field coupling arrangement for receiving a magnetic field of the second frequency produced by the tag and providing a corresponding electrical signal, with the second magnetic field coupling arrangement including at least one receiver coil disposed adjacent one end of the solenoidal coil; and circuitry connected to the receiver coil for decoding the received electrical signal. Preferably the tag is disposed on the lid of a trash or waste bin with the tag coil being substantially horizontal and the axis of the exciter coil is disposed substantially vertically.

20 Claims, 7 Drawing Sheets

FIG. 7

READER SYSTEM FOR WASTE BIN PICKUP VEHICLES

CROSS-REFERENCE TO RELATED APPLICATION

The present application is a continuation-in-part of U.S. patent application Ser. No. 08/232,478, filed Apr. 26, 1994, now abandoned.

BACKGROUND OF THE INVENTION

The present invention relates to improved reader for a radio frequency identification (RFID) tag. More particularly, the present invention relates to an improved reader or reading arrangement mounted on the end of a robot arm, which is disposed on a waste or trash vehicle, for picking up containers or bins of trash waste or the like which are provided with an RFID tag.

It has become increasingly usual in both commercial and residential waste or trash collection for the collector to provide customers with specially designed waste or trash bins which, for collection of the waste or trash, are engaged by a robot arm mounted on a trash or waste vehicle and are lifted vertically to empty the bins into the vehicle or trash truck. The empty bins are then lowered to the ground and returned to the customer. In order for the bins to be engaged and emptied in this manner, it is necessary for the customer to place the bin at a particular location, and preferably with a particular orientation. In the case of residential customers, this generally entails placing the bin adjacent to the curb on the collection day. In this way, the waste or trash truck can move along the curb and sequentially pickup and empty the bins disposed there for collection.

Since the cost of waste or trash collection is often times dependent on the number of containers which are picked up in a given period of time and since, when private trash collection companies are involved, it is possible to have competing trash collection companies which collect trash on the same day, it is necessary to provide some identification on the individual trash bins or containers which identify the person to which the particular bin or container belongs. Although such identification can be visual, it is preferable to provide some kind of identification which can be read automatically so that the time for such identification can be reduced, and thus the efficiency of the trash collection process improved.

One such type of identification which has been provided is an RFID tag attached to the container which identifies the container and thus the customer. Generally this tag is attached to the lid of the container or bin and is readable by a reader mounted on the truck. In one such known reader for this purpose, e.g., utilizing an inductive loop antenna disposed above the container or bin, the range of the reader is very limited so that difficulty in reading the tag results if the bin or container is not properly oriented adjacent to the curb. For example, if the tag is disposed toward the front of the bin or container, but the container is disposed adjacent to the curb so that it is rotated by 180°, whereby the front of the container faces away from the curb, the reading of the tag may not take place since the distance between the tag and the loop may be greater than the read range. This requires that the truck or vehicle operator or driver stop the vehicle and orient the bin or container prior to pickup by the robot arm. Obviously, this results in an increased cost for the collection operation.

Therefore the primary object of the present invention to provide a reader for an RFID tag which can read the tag at larger distances and at various orientations so as to permit the reading of the tag even when the bin is not in the preferred orientation so that the driver may remain in the vehicle.

SUMMARY OF THE INVENTION

The object is generally achieved according to the invention by a reader for a radio frequency identification tag which has at least one magnetic field transmitting and receiving coil oriented in a given plane and which is responsive to a received magnetic exciter field of a first frequency to produce and radiate an identifying magnetic field comprised of a carrier at a second different frequency modulated by an identifying code, with the reader comprising: first means for producing a radio frequency signal of the first frequency; a first magnetic field coupling arrangement connected to the output of the first means for producing a corresponding exciter field at the first frequency to be magnetically coupled to the receiving coil of the tag, with the first magnetic field coupling arrangement including a solenoidal exciter coil having at least one wound exciter winding and a longitudinal axis disposed substantially perpendicular to the plane of the tag coil; a second magnetic field coupling arrangement for receiving a magnetic field of the second frequency produced by the tag and providing a corresponding electrical signal, with the second magnetic field coupling arrangement including at least one receive coil disposed adjacent one end of the solenoidal coil; and, circuitry connected to the at least one receive coil for decoding the received electrical signal.

According to the disclosed embodiment of the invention, at least the exciter and read coils of the reader are mounted on the end of a robot arm which is moveable in at least the vertical direction, the robot arm is mounted on a trash or waste collection type vehicle for at least vertical direction of movement, the axis of the solenoidal exciter coil is substantially vertical, and the robot arm is designed and used for picking up a trash bin or container having a radio frequency identification tag affixed to its lid with the tag coil being substantially horizontal.

According to one embodiment of the invention, the receiver coil is wound around the axis of the solenoidal exciter coil.

However, according to the preferred embodiment of the invention, the receiver coil is disposed along the longitudinal axis of the solenoidal exciter coil and is oriented substantially perpendicular to the solenoidal exciter coil. Still more preferably, a further receiver coil is disposed along the axis of the solenoidal exciter coil at an opposite end of the solenoidal exciter coil from the first receiver coil and is arranged substantially perpendicular to the solenoidal exciter coil, both receiver coils are flat coils, and the two receiver coils are connected in parallel and in phase opposition.

BRIEF DESCRIPTION OF THE DRAWINGS

FIGS. 5a and 5b are schematic side and end views, respectively, of the exciter coil and reader receiver coils according to the preferred embodiment of the invention.

DETAILED DESCRIPTION OF THE PREFERRED EMBODIMENT

Figure 1:
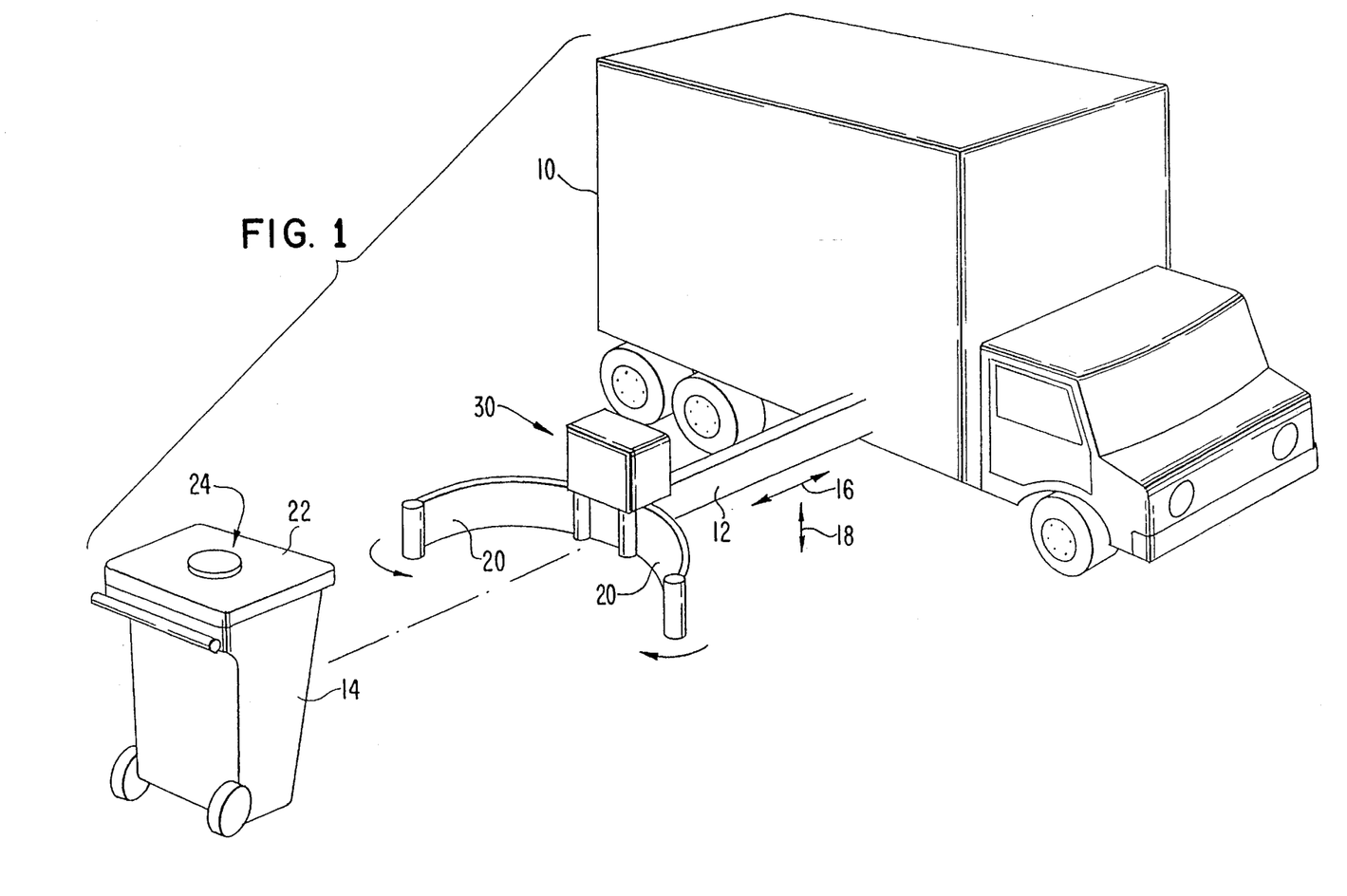
FIG. 1 is a schematic side view showing a waste truck with a robot arm with a reader for engaging and lifting a waste bin provided with an RFID tag.
Figure 2:
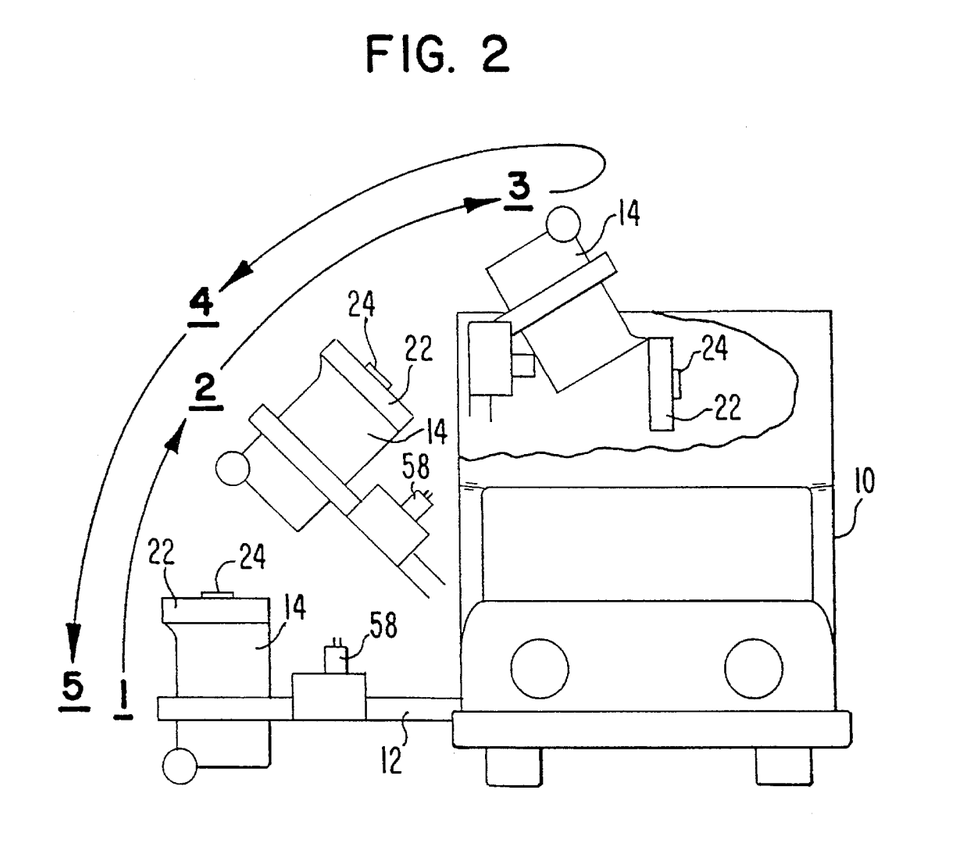
FIG. 2 is a schematic front view of a trash truck indicating the lifting and dumping of a trash or waste bin as shown in FIG. 1.

Referring now to FIGS. 1 and 2, there shown a waste or trash truck 10 provided with a robot arm 12 which, in a known manner, is mounted on the side of the truck 10 for lateral movement toward and away from a waste or trash bin 14 and for vertical movement so as to be able to lift the bin 14 and empty same into the open top of the truck 10. The relative directions of movement of the robot arm 12 are indicated by the double ended arrows 16 and 18 in FIG. 1. The front end of the robot arm 12 is provided with a pair of gripper arms 20 which, in a known manner, are controllable from on board the vehicle by the operator, and which can at least partially surround the bin 14 to grip same to permit lifting of the bin 14 as shown in FIG. 2.

Figure 4A:
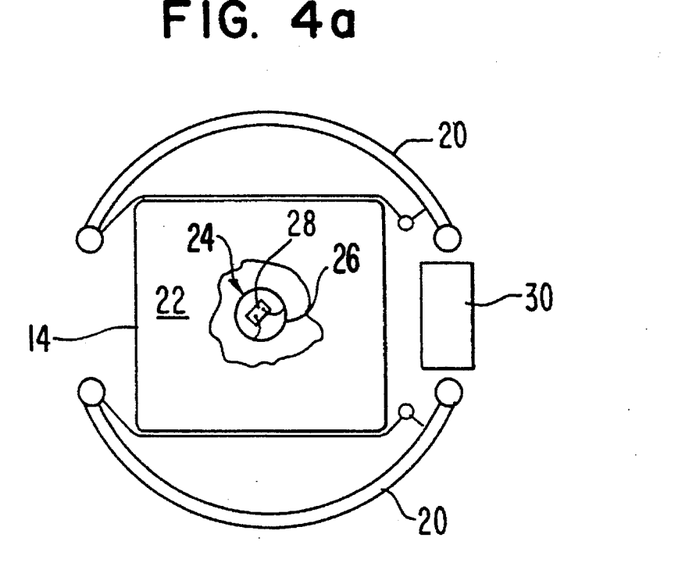
FIGS. 4a and 4b are schematic top and side views showing the orientation of the reader exciter and reader coils relative to the RFID tag on the lid of the waste bin.

The waste or trash bin 14 is provided with a lid 22 which, in a known manner, is hinged along one side so that it can swing open for the insertion of waste or trash and/or when the bin 14 is inverted for dumping as shown in FIG. 2. In order to identify the container 14, an RFID tag 24 is mounted in or on the lid 22 at a desired location, e.g. in the center as shown or possibly toward the front. The tag 24 is of the type which is responsive to an excitation magnetic field or signal of a first frequency to generate a magnetic field or signal of a second frequency which is modulated with a coded signal identifying the bin 14. Such RFID tags are well known in the art. While any tag which operates in this manner may be utilized, preferably the RFID tag is of the type disclosed in commonly assigned U.S. Pat. No. 5,099,227 (but utilizing only magnetic coupling) with a single coil used both for excitation and for information transmission. A specific physical embodiment of a preferred tag which can be utilized is disclosed in commonly assigned co-pending U.S. patent application Ser. No. 07/823,784, filed Jan. 22, 1992. In general, such a tag includes, as schematically shown in FIG. 4a, a relatively flat or thin coil 26 connected to an integrated circuit (IC) 28 disposed within the confines of the coil 26. Thus, the coil 26 of RFID tag 24 is disposed substantially in a horizontal plane within the lid 22 of the bin 14.

In order to read the tag 24, an RFID reader, for example of the type generally shown in the above mentioned commonly assigned U.S. Patent, is mounted on the truck 10. To couple the exciter magnetic field of the first frequency to the tag 24 and to receive the modulated magnetic field of the second frequency transmitted from the tag 24, according to the present invention the magnetic exciting and receiving coils or antennas for the reader are mounted at the end of the arm 12 in an antenna or coil housing 30 as shown in FIG. 1 and in FIGS. 4a and 4b. Accordingly, with the arrangement according to the present invention, and as shown in FIG. 2, the bin 14 can be read at any position during its up and down path, i.e. during its upward path and positions 1 and 2 or during its downward path in positions 4 and 5 after being emptied or dumped in position 3.

Figure 3:
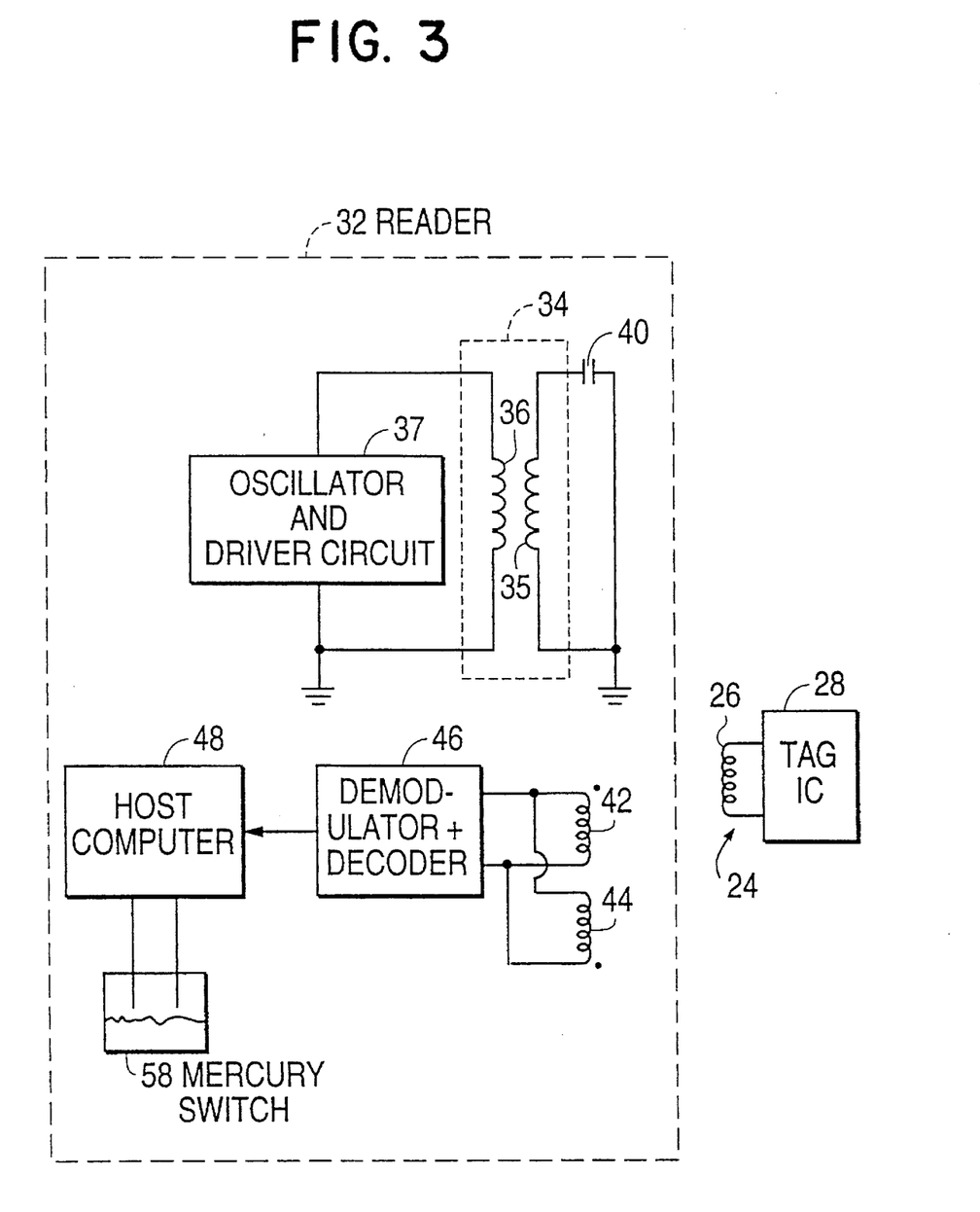
FIG. 3 is a schematic block circuit diagram of an RFID tag and a reader according to an embodiment of the invention.

Turning now to FIG. 3, there is shown a basic block circuit for the preferred embodiment of the reader and tag used for the present invention. As indicated above, the tag 24 preferably is the type which utilizes a single coil or antenna 26 both for receiving and for transmitting, with this single coil being coupled to the tag integrated circuit (IC) 28. To excite the tag 24, the tag reader 32 includes an exciter coil 34 which, as shown, preferably includes a primary winding 36 connected to an oscillator and drive circuit 37 and a secondary winding 38 which in turn is connected to a capacitor 40 to form a resonant circuit at the exciter frequency. To receive or couple in the magnetic field at the second frequency transmitted by the coil 26 of the tag 24, the reader 32 is provided with at least one receive coil 42, and preferably, as will be discussed in more detail below, a pair of parallel connected receive coils 42 and 44. In any case, receive coil 42 or coils 42, 44 are connected to a demodulator-decoder 46 which demodulates the received signal and decodes same to identify the bin 14 associated with the received code. The demodulated and decoded signal provided at the output of the unit 46 is then fed to a host computer 48 for storage and further data processing.

Figure 4B:
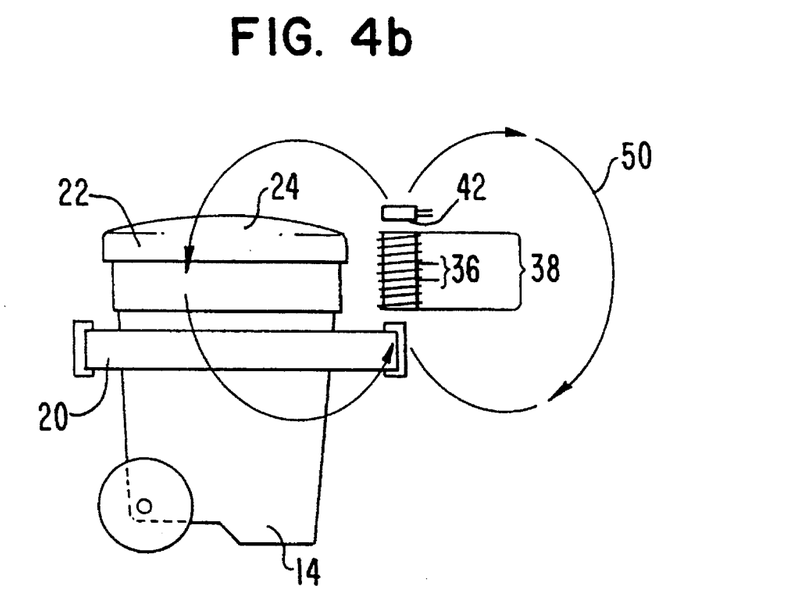

According to the invention, in order to provide an extended range for reading of the tag 24, the exciter coil 34, i.e., both the primary winding 36 and the secondary winding 38 are provided as shown in FIGS. 4a and 4b as helically wound solenoidal or solenoid type coils, with the axis of the solenoid type exciter coil 34 being substantially perpendicular to the plane of the tag coil 26. In the illustrated embodiment of the invention with the tag coil 26 being oriented in a substantially horizontal plane, the exciter coil 34 is mounted on the front end of the robot arm 12 so that the axis of the coil 34 is substantially vertical as shown. Preferably, as further shown in FIGS. 4a and 4b (see also FIGS. 5a–6c), the solenoidal exciter coil 34 is preferably provided with a rectangular shape in cross section, with the elongated side facing forward, i.e. toward the location of the tag 24. With this orientation, the magnetic excitation field lines 50 which clearly pass, as indicated, through the coil 26 of the tag 24. As shown in FIG. 4b, the reader receive coil 42 may be wound around the longitudinal axis of the solenoidal coil 34, and may be disposed adjacent one end of same.

Figure 6A:
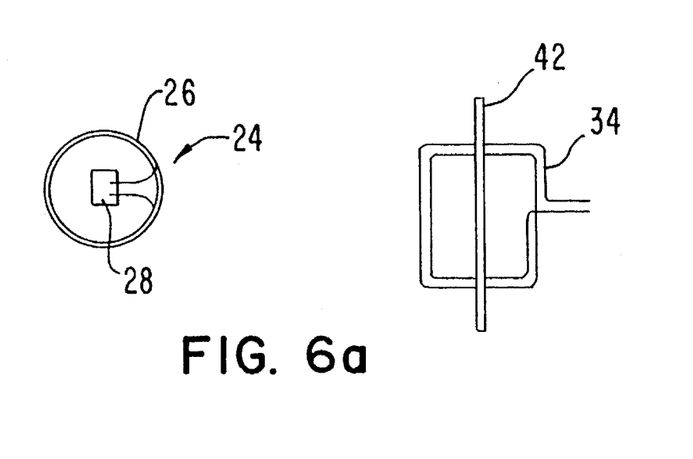
FIGS. 6a, 6b and 6c are schematic top, side and rear views, respectively, showing the geometrical arrangement of the exciter coil and the receiver coils relative to the tag coil according to the preferred embodiment of the invention shown in FIGS. 5a and 5b.
Figure 6B:
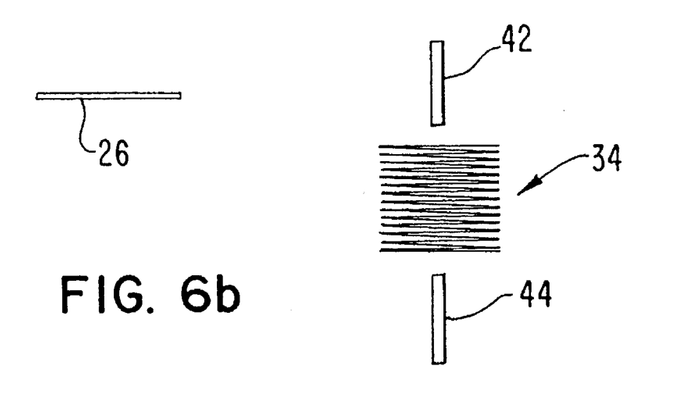
Figure 6C:
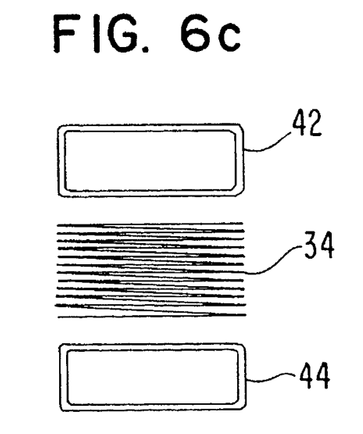

Turning now to FIGS. 5a, 5b and 6a–6c, there is shown a preferred embodiment of the arrangement for the solenoidal exciter coil 34 and the receiver coil 42, and preferably receiving coils 42 and 44. According to these figures, the solenoidal exciter coils 36 and 38 are helically wound on a generally rectangular coil form 52 which is vertically mounted on the robot arm 12, i.e., the opening in the form is oriented vertically. The secondary winding 38, as indicated, has a substantially greater number of turns than the primary winding 36, which is interleaved with the secondary winding at one end thereof. It should be noted, however, that the primary winding 36 can equally be well be at the other end of the secondary winding 38 or disposed in the center thereof. Disposed within the opening in the coil form 52 adjacent each end of the secondary winding 38, is a respective receiver coil 42 or 44. The receiver coils 42 and 44 are preferably wound flat, i.e., with the windings not being bundled or overlapped, and with the respective receiver coils 42 and 44 being disposed along the axis of the solenoidal exciter coil 34 (36, 38) and perpendicular, i.e. at a 90° angle, to the solenoidal exciter coil 34 or coil form 52. As can be seen in FIG. 6a–6c, the receiver coils 42 and 44 are orientated such that their larger surfaces (or longitudinal axes) face the tag 24, with both of the receiver coils 42 and 44 having substantially the same orientation. As further shown in FIG. 5a (and in FIG. 3) the two receiver coils 42 and 44 are connected electrically in parallel and are wound or connected so that they are 180° out of phase. This coil configuration with the indicated connection effectively cancels out substantially all exciter interference and many other unwanted signals, while still favoring the orientation of the tag coil 26 when in a fringe of the reader area. However, as the tag comes closer to the reader coils, the orientation ceases to be a problem.

Figure 7:
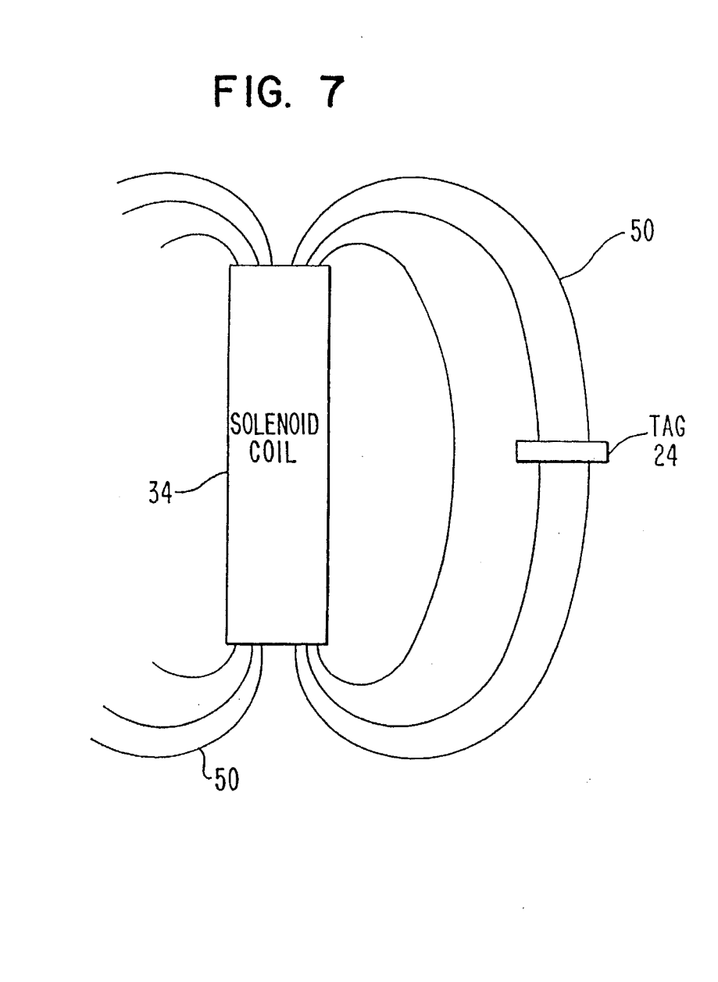
FIG. 7 is a schematic side view showing the exciter coil and the exciter field lines relative to the tag coil orientation to the invention.
Figure 8:
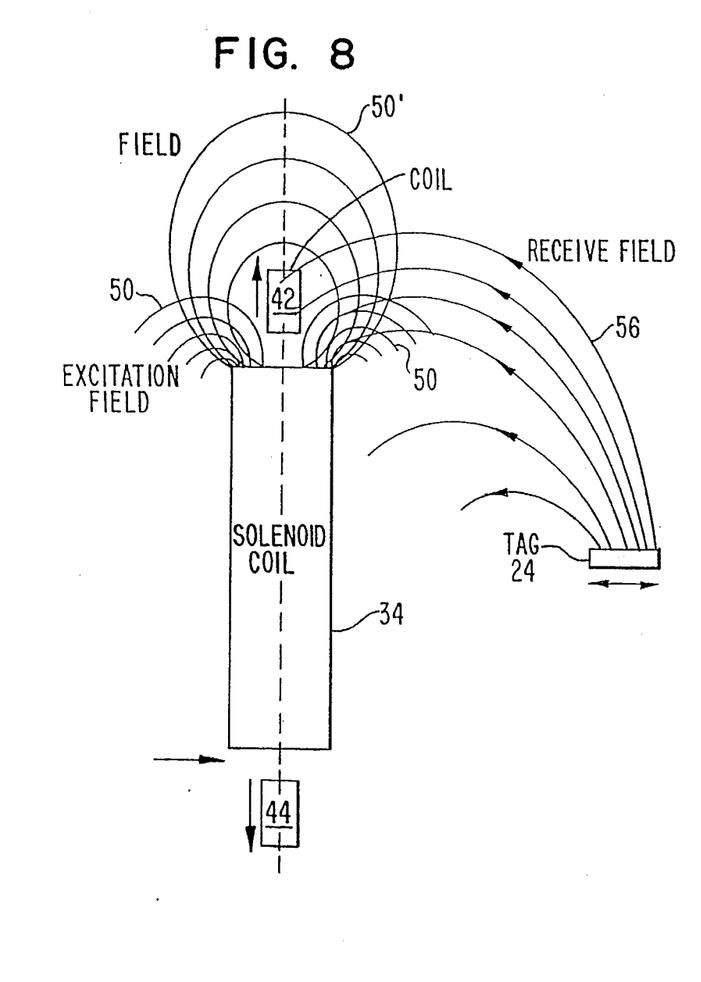
FIG. 8 is a schematic side view showing the relative orientations of the exciter coil and the receiver coils, as shown in FIG. 5a and 5b, relative to the excitation field and receive field from the tag for maximum rejection by the reader receiver coil(s) of the excitation field and noise, and for maximum coupling with the tag receive field transmitted by the tag.

Turning now to FIGS. 7 and 8, the field lines for the various magnetic fields involved between the tag 26 and the coils 34, 42 and 44 of the reader are shown. FIG. 7 shows the excitation field lines 50 from the solenoidal excitation coil 34 relative to the orientation of the tag 26. In addition to the donut or toroidal shaped excitation field lines 50 shown in FIG. 7, which tend to excite the tag 26 with the given orientation, as shown in FIG. 8, the excitation field includes a further portion 50' extending from each end of the solenoidal coil 34 (only the excitation field lines 50' at one end of the solenoidal coil 34 being shown). The respective receiver coils 42 and 44 are disposed within the opening in the field lines 50 and within the major field lines 50' so that very little of this excitation field is coupled into the receiver coils 42 and 44. As indicated above, the coils 42 and 44 are wound and connected so that they are 180° out of phase (as indicated by the arrows adjacent the respective coils which denote the direction of winding of the coils). Thus, this tends to couple out other interfering signals. However, as will be appreciated, the field lines 56 transmitted by the tag 26 are received by the coils 42 and 44 to provide an increased range.

As an example of an exciter and receiver coil arrangement built according to the preferred embodiment of the invention shown in FIGS. 5a and 5b, the solenoidal exciter coil 34 is a solenoid type coil wound vertically on a form 52 having a height and width of 17" each and a depth of 3.5". The solenoidal coil 34 was wound with number 14 insulated wire with approximately one quarter inch spacing between the windings of a secondary winding 38 having 32 turns and between the windings of a primary winding 36 having 8 turns interleaved between turns of the secondary winding 38. Each of the receiver coils 42 and 44 is a flat wound coil with dimensions of three inches by fifteen inches on its broad surface and a thickness of one half inch. The coils 42 and 44 were mounted so that they were spaced approximately one and one half inches from the ends respective of the solenoidal exciter coil 34. With such a coil construction and an applied voltage of 24 volts DC at 750 ma., the tag could be turned on and data transmitted at a distance of thirty-eight inches, with an optimum orientation read being approximately 25–31 inches depending on the particular tag configuration.

Finally, a further problem with waste collection utilizing bins 14, is the problem of truck operators lifting and dumping extra waste bins 14 which are not provided with RFID identifying tags 24, and thus for which the truck owner will receive no payment, since there will be no record of such bins being lifted and dumped. To avoid this problem, according to a further feature of the invention, a simple switch 58, for example, a mercury switch, is mounted on the robot arm 12, preferably in a hidden position so as to be substantially tamper proof, for example, within the antenna housing 30, so that the contacts are normally open when the arm 12 is in the lowered position (positions 1 and 5 in FIG. 2), and close when the arm 12 is raised so as to dump a bin or container 14 (position 3 in FIG. 2). Closing of the contacts of the switch 58 is detected by the on-board computer 48, which likewise receives the decoded signal from the demodulator and decoder 46. Thus, for each bin or container 14 which is dumped or emptied into the truck 10, the on-board computer 48 should receive signals from both the switch 58 and the demodulator and decoder 46. The computer 48 can thus count the number of dumps and determine whether there have been more dumps than recorded bin numbers to indicate a discrepancy. Preferably this latter feature is utilized together with the solenoidal exciter coil and receiver coil arrangement (34, 42, 44) for the reader according to the above described invention. However, it is to be understood that the switch arrangement 58 may be utilized with any type of RFID reader, i.e., its usefulness is not limited to the preferred embodiment of the reader coil arrangement discussed above.

The invention now being fully described, it will be apparent to one of ordinary skill in the art that any changes and modifications can be made thereto without departing from the spirit or scope of the invention as set forth herein.

What is claimed:

1. A reader for reading a radio frequency identification tag affixed to a lid of a trashbin and having at least one magnetic field transmitting and receiving coil which is oriented in a given plane and which is responsive to a received magnetic exciter field of a first frequency to produce and radiate an identifying magnetic field comprised of a carrier at a second different frequency modulated by an identifying code; said reader being mounted on the end of a robot arm, which is mounted on a trash truck for movement in at least the vertical direction and which is designed and used for picking up a trash bin having a radio frequency identification tag affixed to its lid, with said reader comprising:

first means for producing a radio frequency signal of the first frequency;

a first magnetic field coupling arrangement connected to the output of said first means for producing a corresponding exciter field at said first frequency to be magnetically coupled to the receiving coil of the tag, said first magnetic field coupling arrangement including a solenoidal exciter coil having at least one wound exciter winding, and a longitudinal axis disposed substantially vertically and perpendicular to the plane of the tag coil;

a second magnetic field coupling arrangement for receiving a field of said second frequency produced by the tag and providing a corresponding electrical signal, said second magnetic field coupling arrangement including at least one receiver coil disposed adjacent one end of said solenoidal coil; and, circuitry connected to said at least one receiver coil for decoding the received electrical signal.

2. A reader as defined in claim 1 wherein said at least one receiver coil is wound concentric with said axis of said solenoidal coil.

3. A reader as defined in claim 1 wherein said at least one receiver coil is disposed along said longitudinal axis of said solenoidal exciter coil and is oriented substantially perpendicular to said solenoidal exciter coil.

4. A reader as defined in claim 3 including a further said receiver coil disposed along said axis of said solenoidal exciter coil adjacent an opposite end of said solenoidal exciter coil and arranged substantially perpendicular to said solenoidal exciter coil, with said receiver coils both having the same origination with their longitudinal axes facing in the direction toward the tag.

5. A reader as defined in claim 4 wherein said receiver coils are flat coils.

6. A reader as defined in claim 4 wherein said receiver coils are connected in parallel and in phase opposition.

7. A reader as defined in claim 6 wherein said solenoidal exciter coil includes a primary winding connected to said first means and a secondary winding connected in parallel with a capacitor and forming a circuit resonant at said first frequency.

8. A reader as defined in claim 6 wherein: said solenoidal exciter coil produces a toroidal shaped excitation field and a respective field portion enclosing each end of said exciter coil; and, said receiver coils are disposed substantially within the center opening of said toroidal shaped excitation field and within major field lines of the respective end field portions, whereby little of the excitation field is coupled into the respective receiver coils.

9. A reader as defined in claim 6 wherein said receiver coils are flat coils.

10. A reader as defined in claim 9 further comprising: a switch mounted on said end of said robot arm and responsive to the position of said arm to have open contacts when said arm is in a lowered position and to have closed contacts when said arm is in a raised position to empty a bin into said truck; and means for counting and storing the number of closures of said switch.

11. A reader for reading a radio frequency identification tag having at least one magnetic field transmitting and receiving coil which is oriented in a given plane and which is responsive to a received magnetic exciter field of a first frequency to produce and radiate an identifying magnetic field comprised of a carrier at a second different frequency modulated by an identifying code; said reader comprising:

first means for producing a radio frequency signal of the first frequency;

a first magnetic field coupling arrangement connected to the output of said first means for producing a corresponding exciter field at said first frequency to be magnetically coupled to the receiving coil of the tag, said first magnetic field coupling arrangement including a solenoidal exciter coil having at least one wound exciter winding, and a longitudinal axis disposed substantially perpendicular to the plane of the tag coil;

a second magnetic field coupling arrangement for receiving a field of said second frequency produced by the tag and providing a corresponding electrical signal, said second magnetic field coupling arrangement including at least one receiver coil disposed adjacent one end of said solenoidal coil, with said at least one receiver coil being disposed along said longitudinal axis of said solenoidal exciter coil and being oriented substantially perpendicular to said solenoidal exciter coil; and, circuitry connected to said at least one receiver coil for decoding the received electrical signal.

12. A reader as defined in claim 1 further comprising: a switch mounted on said end of said robot arm and responsive to the position of said arm to have open contacts when said arm is in a lowered position and to have closed contacts when said arm is in a raised position to empty a bin into said truck; and means for counting and storing the number of closures of said switch.

13. A reader as defined in claim 12 wherein said switch is a mercury switch.

14. A reader as defined in claim 11 including a further said receiver coil disposed along said axis of said solenoidal exciter coil adjacent an opposite end of said solenoidal exciter coil, and arranged substantially perpendicular to said solenoidal exciter coil, with said receiver coils both having the same origination with their longitudinal axes facing in the direction toward the tag.

15. A reader as defined in claim 14 wherein said solenoidal exciter coil includes a primary winding connected to said first means and a secondary winding connected in parallel with a capacitor and forming a circuit resonant at said first frequency.

16. A reader as defined in claim 14 wherein said receiver coils are connected in parallel and in phase opposition.

17. A reader as defined in claim 16 wherein said receiver coils are flat coils.

18. A reader as defined in claim 16 wherein: said solenoidal exciter coil produces a toroidal shaped excitation field and a respective field portion enclosing each end of said exciter coil; and, said receiver coils are disposed substantially within the center opening of said toroidal shaped excitation field and within major field lines of the respective end field portions, whereby little of the excitation field is coupled into the respective receiver coils.

19. A reader as defined in claim 16, wherein said reader is mounted on the end of a robot arm which is moveable in at least the vertical direction.

20. A reader as defined in claim 19 wherein said robot arm is mounted on a vehicle for said movement in at least the vertical direction, and said axis of said solenoidal coil is substantially vertical.

* * * * *